United States Patent
Thuma et al.

(10) Patent No.: US 12,001,892 B2
(45) Date of Patent: *Jun. 4, 2024

(54) SYSTEMS AND METHODS FOR PROVIDING CLOUD COMPUTING SEMANTIC LAYER OPERATIONS

(71) Applicant: Fidelity Information Services, LLC, Jacksonville, FL (US)

(72) Inventors: John Thuma, Lutz, FL (US); Timothy Charles Nargassans, Saint Johns, FL (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,730

(22) Filed: Jun. 22, 2023

(65) Prior Publication Data

US 2023/0333907 A1    Oct. 19, 2023

Related U.S. Application Data

(63) Continuation of application No. 18/146,956, filed on Dec. 27, 2022, now Pat. No. 11,720,411, which is a
(Continued)

(51) Int. Cl.
*G06F 9/50* (2006.01)
*G06F 9/48* (2006.01)
(Continued)

(52) U.S. Cl.
CPC .......... *G06F 9/5072* (2013.01); *G06F 9/4881* (2013.01); *G06F 9/505* (2013.01);
(Continued)

(58) Field of Classification Search
CPC ...... G06F 9/5072; G06F 9/4881; G06F 9/505; H04L 67/63
See application file for complete search history.

(56) References Cited

U.S. PATENT DOCUMENTS 7,716,234 B2 *  5/2010  Naibo ................... G06F 16/951
                                                                707/760
8,583,799 B2   11/2013  Podila
(Continued)

OTHER PUBLICATIONS

Loutas, et al., "Towards a Reference Architecture for Semantically Interoperable Clouds," 2010 IEEE second international conference on cloud computing technology and science. IEEE, 2010. Nov. 30, 2010. (9 pages).
(Continued)

*Primary Examiner* — Nazia Naoreen
(74) *Attorney, Agent, or Firm* — Finnegan, Henderson, Farabow, Garrett & Dunner, LLP

(57) ABSTRACT

The disclosed embodiments include a method for providing cloud computing semantic layer. The method comprises receiving a description of a semantic layer operation performed by a semantic layer, the description including multiple implementations of the semantic layer operation, the multiple implementations differing in at least one of cloud operations used or cloud computing platforms used; receiving a request that indicates performance of the semantic layer operation; receiving first resource usage indications corresponding to the cloud operations, wherein the first resource usage indications comprise direct or indirect indications of least one of a storage amount, a compute amount, a number of transactions, a bandwidth, a number of application programming interface calls, or an application or database type associated with each of the cloud operations; selecting a first one of the multiple implementations; and
(Continued)

communicating with the first one of the cloud providers to perform the semantic layer operation.

20 Claims, 6 Drawing Sheets

Related U.S. Application Data continuation of application No. 17/806,250, filed on Jun. 9, 2022, now Pat. No. 11,726,832, which is a continuation of application No. 17/119,952, filed on Dec. 11, 2020, now Pat. No. 11,392,420, which is a continuation of application No. 17/119,843, filed on Dec. 11, 2020, now Pat. No. 11,394,803.

(51) Int. Cl.
    *G06F 11/34*      (2006.01)
    *H04L 43/06*      (2022.01)
    *H04L 43/55*      (2022.01)
    *H04L 67/63*      (2022.01)

(52) U.S. Cl.
    CPC ........ *G06F 9/5077* (2013.01); *G06F 11/3409* (2013.01); *H04L 43/06* (2013.01); *H04L 43/55* (2022.05); *H04L 67/63* (2022.05); *G06F 2209/501* (2013.01)

(56) References Cited

U.S. PATENT DOCUMENTS

| | | | | |
|---|---|---|---|---|
| 9,135,583 | B2* | 9/2015 | Naibo | G06Q 10/06 |
| 9,280,788 | B2* | 3/2016 | Ferrari | G06Q 30/06 |
| 9,842,137 | B2* | 12/2017 | Faerber | G06F 16/24542 |
| 9,996,326 | B2 | 6/2018 | Gschwind | |
| 10,164,896 | B2 | 12/2018 | Velasco | |
| 2007/0276815 | A1 | 11/2007 | Naibo et al. | |
| 2012/0005190 | A1 | 1/2012 | Faerber et al. | |
| 2013/0339311 | A1 | 12/2013 | Ferrari et al. | |
| 2015/0039765 | A1 | 2/2015 | Bragstad et al. | |
| 2017/0351753 | A1* | 12/2017 | Duncker | G06F 16/338 |

OTHER PUBLICATIONS

He, "Semantic Layer: The BI Trend You Don't Want to Miss," Kyligence, Aug. 6, 2020, Retrieved from <https://kyligence.io/blog/semantic-layer-the-bi-trend-you-dont-want-to-miss-in-2020/> (14 pages).

PCT Notification of Transmittal, PCT International Search Report, and PCT Written Opinion, corresponding with PCT/US2021/054506, dated Jan. 18, 2022. (10 pages).

The extended European search report and Supplementary European Search Report issued by European Patent Office in corresponding with a European Application No. 21904051.6, mailed Mar. 20, 2024. (9 pages).

Bhavsar et al., "Semantic Enabled Cloud for Compute—Intensive Applications," 2016 International Conference on Internet of Things and Applications (IOTA), Maharashtra Institute of Technology, Pune, India Jan. 22-24, 2016 (5pgs).

Portosa et al., "Heterogeneous Cloud Systems Monitoring Using Semantic and Linked Data Technologies," 2015 IFIP/IEEE International Symposium on Integrated Network Management (IM), Ottawa, ON, Canada, 2015, pp. 497-503 (7pgs).

* cited by examiner

```
def build_folder():

folder = filestore.build_folder(folder=name)
    list_folders
```

```
def create_bucket(name, region=None):
    s3 = get_s3(region)

try:
        if region:
            bucket = s3.create_bucket(
                Bucket=name,
                CreateBucketConfiguration={
                    'LocationConstraint': region
                }
            )
        else:
            bucket = s3.create_bucket(Bucket=name)

bucket.wait_until_exists()

logger.info("Created bucket '%s' in region=%s", bucket.name,
                    s3.meta.client.meta.region_name)
    except ClientError as error:
        logger.exception("Couldn't create bucket named '%s' in region=%s.",
                         name, region)
        if error.response['Error']['Code'] == 'IllegalLocationConstraintException':
            logger.error("When the session Region is anything other than us-east-1, "
                         "you must specify a LocationConstraint that matches the "
                         "session Region. The current session Region is %s and the "
                         "LocationConstraint Region is %s.",
                         s3.meta.client.meta.region_name, region)
        raise error
    else:
        return bucket
```

FIG. 4C

SYSTEMS AND METHODS FOR PROVIDING CLOUD COMPUTING SEMANTIC LAYER OPERATIONS

CROSS-REFERENCE TO RELATED APPLICATIONS

This application is a continuation of application Ser. No. 18/146,956, filed Dec. 27, 2022, which is a continuation of application Ser. No. 17/806,250, filed Jun. 9, 2022, which is a continuation of application Ser. No. 17/119,952, filed Dec. 11, 2020, now U.S. Pat. No. 11,392,420, which is a continuation of application Ser. No. 17/119,843, filed Dec. 11, 2020, now U.S. Pat. No. 11,394,803, all of which is are incorporated herein by reference in their entireties.

BACKGROUND OF THE INVENTION

Cloud computing can enable the sharing of resources to achieve coherence and economies of scale. Cloud computing platforms can enable computing services to be delivered on demand to companies or customers over the internet. In this manner, a user can access these computing services without having to provide the infrastructure necessary to support them.

Multiple cloud providers offer cloud computing platforms, each offering a different combination of services and a different interface. Selecting the appropriate cloud computing platform and the appropriate services for a task may require time and special expertise. Furthermore, cloud providers may change service offerings or interfaces, so cloud migration may require continued engagement, not merely a one-time effort.

SUMMARY

The disclosed systems and methods relate to a semantic layer configured to interface with cloud computing platform(s) and enable performance of operations without requiring a client to directly engage with the cloud computing platform(s).

The disclosed embodiments include a system for providing a cloud computing semantic layer operation. The system can include at least one processor; and at least one non-transitory computer-readable medium containing instructions that, when executed by the at least one processor, cause the system to perform operations. The operations can include: receiving a description of a semantic layer operation performed by a semantic layer, the description including multiple implementations of the semantic layer operation, the multiple implementations differing in at least one of cloud operations used or cloud computing platforms used; receiving, from a client interacting with the semantic layer, a request that indicates performance of the semantic layer operation; receiving, from cloud providers associated with each of the cloud computing platforms, first resource usage indications corresponding to the cloud operations, wherein the first resource usage indications can include direct or indirect indications of least one of a storage amount, a compute amount, a number of transactions, a bandwidth, a number of application programming interface calls, or an application or database type associated with each of the cloud operations; selecting, in response to the request, a first one of the multiple implementations based on the received first resource usage indications, the first one of the multiple implementations using a first one of the cloud computing platforms; and communicating with the first one of the cloud providers to perform the semantic layer operation in accordance with the request and using the selected first one of the multiple implementations.

The disclosed embodiments further include a method for providing a cloud computing semantic layer operation. The method can include receiving, by a computing system that implements a semantic layer, a description of a semantic layer operation, the description specifying performance of the semantic layer operation by the semantic layer using a first cloud operation performed on a first cloud computing platform; receiving, by the computing system from a cloud provider associated with the first cloud computing platform, a first resource usage indication corresponding to the first cloud operation, wherein the resource usage indication can include a direct or indirect indication of least one of a storage amount, a compute amount, a number of transactions, a bandwidth, a number of application programming interface calls, or an application or database type associated with the first cloud operation; receiving, by the computing system from a client interacting with the semantic layer, a request that indicates performance of the semantic layer operation; providing, to the client, an estimated resource usage indication based on the request and the received first resource usage indication; receiving, from the client in response to provision of the estimated resource usage indication, confirmation of the request; and communicating, by the computing system, with the cloud provider to perform the semantic layer operation in accordance with the request.

The disclosed embodiments further include a non-transitory computer readable medium containing instructions that, when executed by at least one processor of a system, cause the system to perform operations. The operations can include receiving a description of a semantic layer operation, the description specifying performance of the semantic layer operation by a semantic layer using a first cloud operation performed on a first cloud computing platform; receiving, from a cloud provider associated with the first cloud computing platform, a first resource usage indication corresponding to the first cloud operation, wherein the first resource usage indication includes a direct or indirect indication of least one of a storage amount, a compute amount, a number of transactions, a bandwidth, a number of application programming interface calls, or an application or database type associated with the first cloud operation; receiving, from a client interacting with the semantic layer, a request that indicates performance of the semantic layer operation; providing, to the client, an estimated resource usage indication based on the request and the received first resource usage indication; receiving, from the client in response to provision of the estimated resource usage indication, confirmation of the request; and communicating with the cloud provider to perform the semantic layer operation in accordance with the request.

The disclosed embodiments include a system for providing a cloud computing semantic layer operation. The system includes at least one processor; and at least one non-transitory computer-readable medium containing instructions that, when executed by the at least one processor, cause the system to perform operations. The operations include receiving a description of a semantic layer operation performed by a semantic layer, the description including multiple implementations of the semantic layer operation, the multiple implementations differing in at least one of cloud operations used or cloud computing platforms used; receiving, from a client interacting with the semantic layer, a request that indicates performance of the semantic layer operation; receiving, from cloud providers associated with each of the cloud computing platforms, first resource usage indications corresponding to the cloud operations, wherein the first resource usage indications include direct or indirect indications of least one of a storage amount, a compute amount, a number of transactions, a bandwidth, a number of application programming interface calls, or an application or database type associated with each of the cloud operations; selecting, in response to the request, a first one of the multiple implementations based on the received first resource usage indications, the first one of the multiple implementations using a first one of the cloud computing platforms; and communicating with the first one of the cloud providers to perform the semantic layer operation in accordance with the request and using the selected first one of the multiple implementations.

The disclosed embodiments further include a method for providing a cloud computing semantic layer operation. The method can include receiving, by a computing system that implements a semantic layer, a description of a semantic layer operation performed by the semantic layer, the description including multiple implementations of the semantic layer operation, the multiple implementations differing in at least one of cloud operations used or cloud computing platforms used; receiving, by the computing system from a client interacting with the semantic layer, a request that indicates performance of the semantic layer operation; receiving, by the computing system from cloud providers associated with each of the cloud computing platforms, first resource usage indications corresponding to the cloud operations, wherein the first resource usage indications can include direct or indirect indications of least one of a storage amount, a compute amount, a number of transactions, a bandwidth, a number of application programming interface calls, or an application or database type associated with each of the cloud operations; selecting, by the computing system in response to the request, a first one of the multiple implementations based on the received first resource usage indications, the first one of the multiple implementations using a first one of the cloud computing platforms; and communicating, by the computing system, with the first one of the cloud providers to perform the semantic layer operation in accordance with the request and using the selected first one of the multiple implementations.

The disclosed embodiments further include a non-transitory computer readable medium containing instructions that, when executed by at least one processor of a system, cause the system to perform operations. The operations can include receiving a description of a semantic layer operation performed by a semantic layer, the description including multiple implementations of the semantic layer operation, the multiple implementations differing in at least one of cloud operations used or cloud-computing platforms used; receiving, from a client interacting with the semantic layer, a request that indicates performance of the semantic layer operation; receiving, from cloud providers associated with each of the cloud-computing platforms, first resource usage indications corresponding to the cloud operations, wherein the first resource usage indications include direct or indirect indications of least one of a storage amount, a compute amount, a number of transactions, a bandwidth, a number of application programming interface calls, or an application or database type associated with each of the cloud operations; selecting, in response to the request, a first one of the multiple implementations based on the received first resource usage indications, the first one of the multiple implementations using a first one of the cloud computing platforms; and communicating with the first one of the cloud providers to perform the semantic layer operation in accordance with the request and using the selected first one of the multiple implementations.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 4C depicts an exemplary implementation of the semantic layer operation of FIG. 4B, including calls to cloud operations performed on a cloud computing platform, consistent with the embodiments of the present disclosure.

DETAILED DESCRIPTION

Reference will now be made in detail to the present embodiments, examples of which are illustrated in the accompanying drawings. Wherever possible, the same reference numbers will be used throughout the drawings to refer to the same or like parts.

The disclosed embodiments concern systems and methods for providing computing services through semantic layer that interfaces with cloud computing platform(s). By interacting with the semantic layer rather than the underlying cloud services platforms, a client can be shielded from the complexity of these platforms and provided a consistent interface and set of services, even when the interface and services exposed by the cloud service platform(s) change. The sematic layer can enable a client to perform operations using cloud computing platforms that meet the customer's criteria (e.g., reliability, security, execution performance, resource usage, etc.) without requires an understanding of the underlying cloud service platform. According to some embodiments of the present disclosure, the semantic layer can be configured to interact with both the cloud computing platform(s) and the client, enabling the clients to interact indirectly with the cloud computing platforms of the cloud providers.

Figure 1:
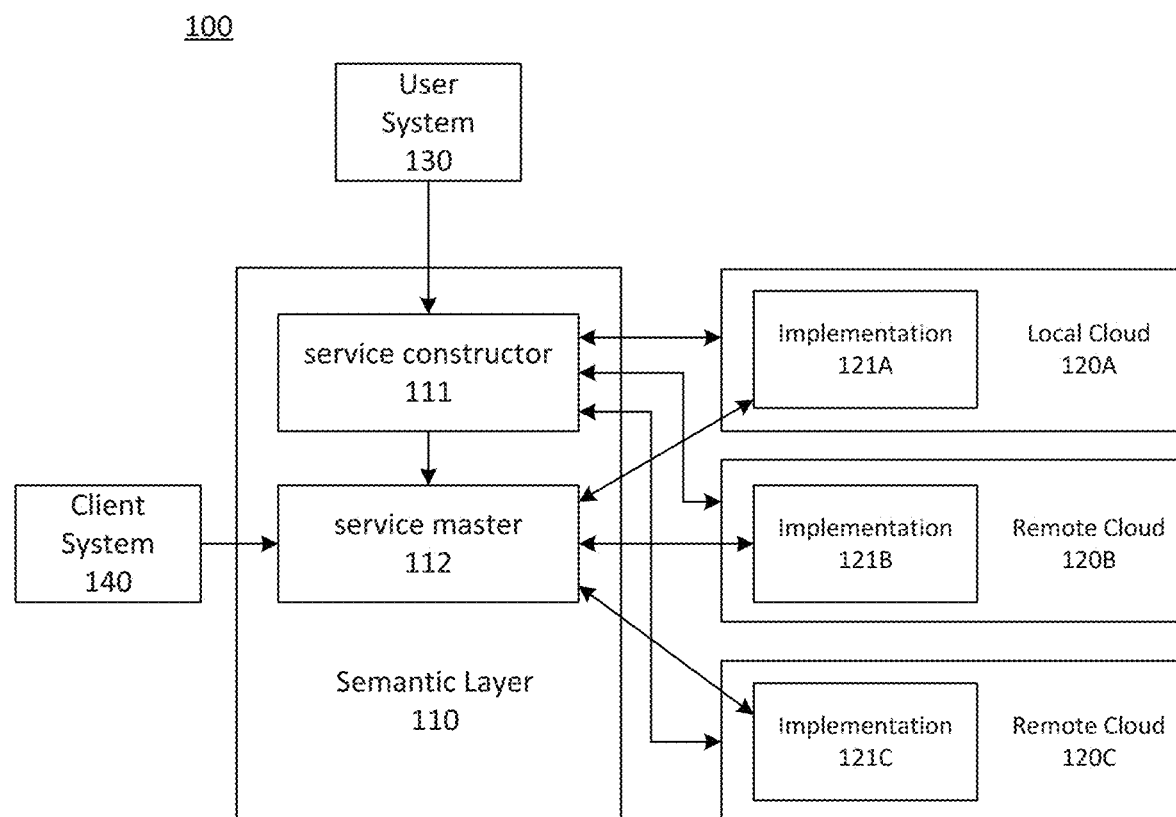
FIG. 1 depicts a schematic diagram illustrating an environment in which a semantic layer may operate, consistent with embodiments of the present disclosure.

FIG. 1 depicts a schematic diagram illustrating an environment 100 in which a semantic layer may operate, consistent with embodiments of the present disclosure. Environment 100 may include a semantic layer 110, at least one cloud computing platform (e.g., local cloud 120a, remote cloud 120b, remote cloud 120c, or the like), a user system 130, and a client system 140. Consistent with disclosed embodiments, user system 130 and local cloud 120a may be associated with the same entity (e.g., the same service provider, not shown in FIG. 1) while user system 130 and remote cloud 120b and remote cloud 120c can be hosted by different entities (e.g., these clouds platforms can be associated with one or more cloud providers, not shown in FIG. 1). Components of environment 100 may be communicatively connected to each other using a network (not shown).

Figure 2:
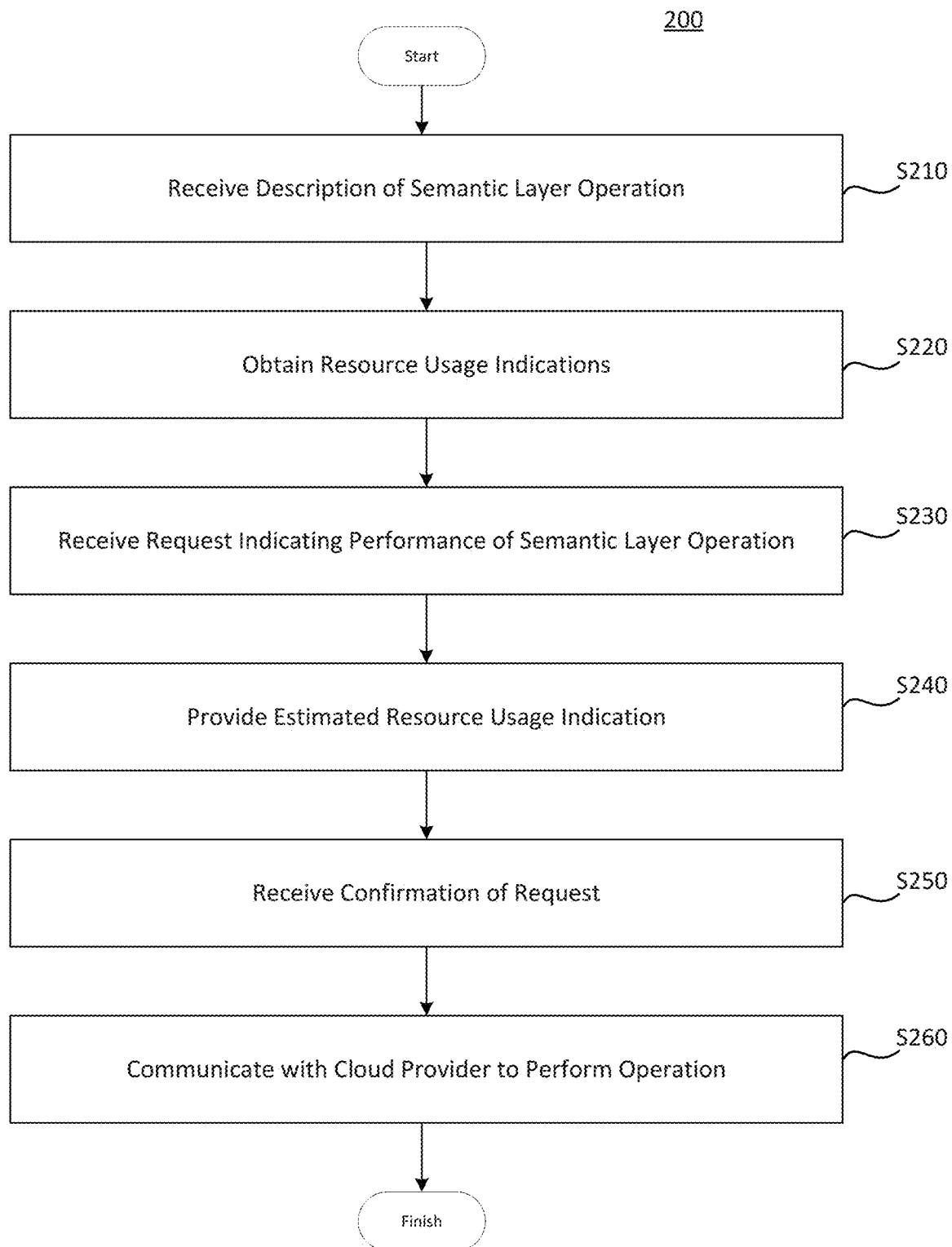
FIG. 2 depicts a flowchart illustrating a first process for providing a cloud computing semantic layer operation, consistent with embodiments of the present disclosure.
Figure 3:
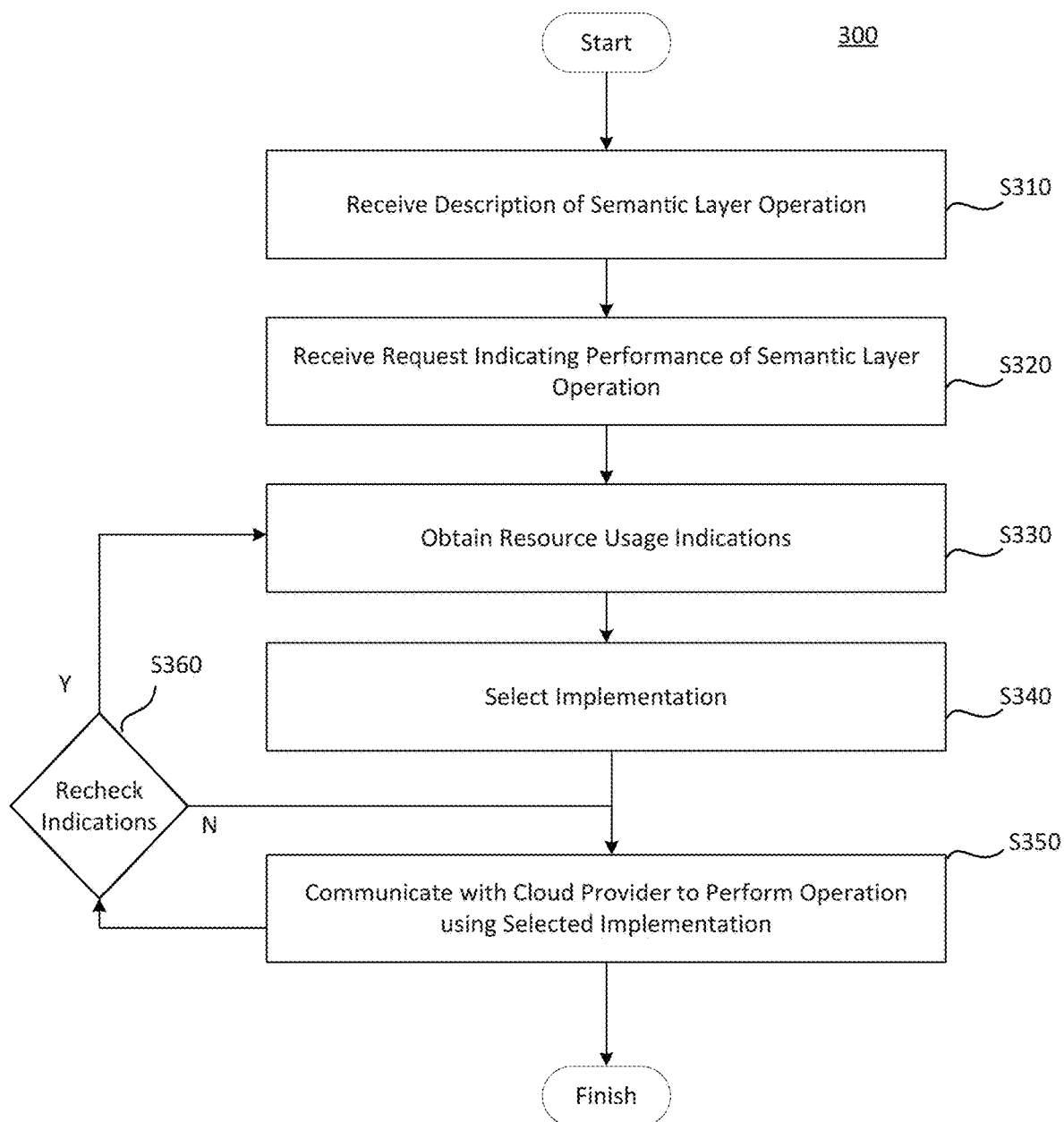
FIG. 3 depicts a flowchart illustrating a second process for providing a cloud computing semantic layer operation, consistent with embodiments of the present disclosure.

Semantic layer 110 may be a computing platform configured to enable performance of semantic layer operations (e.g., as described with regards to FIG. 2 and FIG. 3). Semantic layer operations can include any computing operation performable on a cloud computing platform, or any computing operation that can be decomposed into computing operations performable on cloud computing platform(s), without limitation. Consistent with disclosed embodiments, semantic layer 110 can manage performance of cloud operations on cloud computing platforms (e.g., one or more of local cloud 120a, remote cloud 120b, remote cloud 120c, or the like). Semantic layer 110 may be implemented using one or more computing devices (e.g., laptop, desktop or workstation, computing cluster, or a cloud computing platform). In some embodiments, semantic layer 110 can be a least partially hosted on one of the cloud computing platforms depicted in FIG. 1 (e.g., local cloud 120a). The one or more computing devices can be configured to perform operations consistent with disclosed embodiments. Consistent with disclosed embodiments, semantic layer 110 can be implemented using hardware, software, and/or firmware modules. Semantic layer 110 can be configured to include a service constructor 111 and a service master 112. These components of semantic layer 110 can be configured to communicate with each other, or with external components of semantic layer 110, using a network.

Service constructor 111 can be configured to interact with user system 130 to create a semantic layer operation, in accordance with disclosed embodiments. Service constructor 111 can also be configured to obtain resource usage indications from one or more of the cloud computing platforms, in accordance with disclosed embodiments. In some embodiments, service constructor 111 may provide an interface configured to manage interactions with user system 130. In some embodiments, service constructor 111 may interact with one or more cloud computing platforms through an application program interface (API), web services framework, or other suitable framework. Service constructor 111 may request information or data from cloud provider 120. Service constructor 111 may have application program interfaces that enable service constructor 111 to interact with cloud provider 120, user system 130, other systems, etc. Service constructor 111 may interact with user system 130 through a user interface, which enables user system 130 to perform configurations, administration, and performance of cloud service processes.

Service master 112 may be configured to provide an interface for communication with client system 140. The interface can enable a client to interact with client system 140 to select and configure a semantic layer operation, in accordance with disclosed embodiments. Service master 112 can be configured to communicate with one or more cloud computing platforms to perform the semantic layer operation.

The cloud computing platforms (e.g., local cloud 120a, remote cloud 120b, and remote cloud 120c) can be implemented using computing devices, in accordance with disclosed embodiments. The computing devices can include cloud servers, computer system resources, e.g., data storage and computing devices, software applications, development tools, etc. The computing devices may be general-purpose computing devices, or special-purpose computing devices, such as graphical processing units (GPUs) or application-specific integrated circuits. The computing devices can be configured to host an environment for performing designated functions. For example, the computing devices can host virtual machines, pods, or containers. The computing devices can be configured to run applications for performing designated functions. The disclosed embodiments are not limited to any particular implementation of the cloud computing platforms.

A cloud computing platform can be configured to perform cloud operations, consistent with disclosed embodiments. Such cloud operations can include receiving data or instructions from sematic layer 110, storing data or instructions in databases, processing data, executing applications, or any other functions that may be performed by a cloud computing platform. In some embodiments, the cloud computing platform may provide customers with cloud operations as services. As depicted in FIG. 1, multiple cloud computing platforms can be associated with semantic layer 110 (e.g., local cloud 120a, remote cloud 120b, remote cloud 120c, or the like).

Consistent with disclosed embodiments, a semantic layer operation can be implemented in different ways using different cloud operations. For example, considering the AMAZON WEB SERVICES cloud platform, data may be stored in AWS S3 or AWS GLACIER. Similarly, different cloud computing platforms can offer different cloud computing operations. For example, AMAZON WEB SERVICES can offer data warehousing operations using REDSHIFT, while GOOGLE CLOUD can offer data warehousing operations using BIGQUERY. AMAZON WEB SERVICES, GOOGLE CLOUD, and MICROSOFT AZURE can also offer data warehousing operations through SNOWFLAKE. Such potentially different implementations of a semantic layer operation are depicted in FIG. 1 as implementations 121a to 121c.

User system 130 can be associated with an operator entity (e.g., a natural or legal person) capable of creating semantic layer operations in semantic layer 110. Such an operator entity can be the operator (e.g., owner, administrator, or the like) of semantic layer 110 or be authorized to create semantic layer operations (e.g., a licensee or the like). A user (e.g., a constituent of the entity, such as an employee or contractor, not shown in FIG. 1) can interact with user system 130 to access semantic layer 110 through a user interface provided by semantic layer 110 or a component thereof (e.g., service constructor 111 or another component). The user may be authorized to create, manage, or administrate semantic layer operations that are provided by semantic layer 110. User system 140 may include a mobile device, a tablet, a personal computer, a terminal, a kiosk, a server, a server cluster, a cloud service, a storage device, a specialized device configured to interact with semantic layer 110, or the like.

Client system 140 may be associated with a client entity (e.g., a natural or legal person) authorized to access semantic layer 110 to perform semantic layer operations. In some embodiments, the client entity and the operator entity can be the same entity. For example, a first employee (e.g., an IT employee or other specialist) can interact with semantic layer 110 to create semantic layer operations and a second employee (e.g., a business analyst, data scientist, or the like) can interact with semantic layer 110 to perform the semantic layer operations. In various embodiments, the client entity and the operator entity can be distinct entities. As a non-limiting example, the operator entity can create semantic layer operators for use by various client entities, with may be licensed to use semantic layer 110. A client (e.g., a constituent of the client entity, such as an employee or contractor, not shown in FIG. 1) can interact with client system 140 to access semantic layer 110 through a user interface provided by semantic layer 110 or a component thereof (e.g., service master 12 or another component). Client system 140 may include a mobile device, a tablet, a personal computer, a terminal, a kiosk, a server, a server cluster, a cloud service, a storage device, a specialized device configured to interact with semantic layer 110, or the like.

The particular arrangement of components depicted in FIG. 1 is not intended to be limiting. Environment 100 may include additional components, or fewer components. In addition, semantic layer 110 may include additional components, or fewer components.

FIG. 2 depicts a flowchart illustrating a first process 200 for providing a cloud computing semantic layer operation, consistent with embodiments of the present disclosure. In some embodiments, first process 200 can be performed by semantic layer 110 of FIG. 1.

As illustrated in FIG. 2, at step S210, a description of a semantic layer operation may be received. Step S210 can be performed by semantic layer 110 or a component thereof (e.g., service constructor 111, or a similar component). The description may specify performance of the semantic layer operation by semantic layer 110 using a cloud operation performed on a cloud computing platform (e.g., one or more of local cloud 120a, remote cloud 120b, remote cloud 120c, or the like). In some embodiments, semantic layer 110 may provide a user interface receiving the declarative specification. The user interface can enable a user to upload declarative specifications (e.g. in the form of scripts or programs, or the like). In some embodiments, the user interface can be a graphical user interface. The user can interact with the graphical user interface to provide the description of the semantic layer operation. In some embodiments, the graphical user interface can enable the user to select cloud platforms or cloud computing operations. In some embodiments, the user can interact with the graphical user interface to create architectures or data processing dependences of the semantic layer operation.

In some embodiments, the description of the semantic layer operation may include multiple potential implementations. The multiple implementations may differ in cloud operation(s) used or cloud computing platform(s) used. As a non-limiting example, the semantic layer operation may be storing data in a database. Local cloud 120a may provide two implementations corresponding to the semantic layer operation. A first implementation may include a first cloud operation creating a first database and storing designated data in the first database (e.g., creating and storing data in a SNOWFLAKE database). The first implementation may further include additional cloud operations in addition to the first cloud operation. The additional cloud operations may include operations to provide a certain level of security (e.g., creating and imposing data access conditions on stored data using COLLIBRA, or another suitable a data governance product), transfer data from client system 140 to the local cloud 120a, transfer data back to client system 140, etc. A second implementation supported by local cloud 120a may include a creating a second database and storing the designated data in the database (e.g., creating and storing data in a REDSHIFT database, or other data warehouse product). Similar to the first implementation, the second implementation may further include additional cloud operations. However, these additional cloud operations may not provide the same additional features. For example, they may not impose the same security conditions on access to the data. Or they may provide access to the data differently than the first implementation. Similarly, other cloud computing platforms, e.g., remote cloud 120b or 120c can other implementation(s) corresponding to the semantic layer operation. In some embodiments, the implementations supported by the different cloud computing platforms can be the same, but the associated direct or indirect resource usage indications (described herein) can differ.

In some embodiments, semantic layer 110 or a component thereof (e.g., service constructor 111, or another component) may be configured to configure one or more semantic layer operation options based on the received description of the semantic layer operation. In some embodiments, semantic layer 110 may be configured to construct one or more semantic layer operation options according to instructions or input received from user system 130, e.g, via a user interface. When the description of a semantic layer operation includes multiple implementations, semantic layer 110 can add the descriptions for the multiple implementation to the semantic layer operation. In some embodiments, the first process may further include updating service master 112 to include an entry corresponding to the semantic layer operation. In some embodiments, the entry may indicate the multiple implementations for performing the semantic layer operation. In some embodiments, process 200 may further include displaying the entry via a user interface provided by service master 112 to client system 140. In some embodiments, multiple entries may be displayed to client system 140. The multiple entries may include the entry corresponding to the semantic layer operation and the multiple entries may be associated with different semantic layer operations.

At step S220, resource usage indication(s) can be obtained. Semantic layer 110 or a component thereof (e.g., service constructor 111, or another component) can obtain the resource usage indications. The resource usage indication(s) can correspond to cloud operation(s) performed in implementing the semantic layer operation on a cloud computing platform. In some embodiments, when an implementation of a first cloud computing platform includes a first cloud computing operation, a corresponding resource usage indication can be received from a first cloud computing provider associated with the first cloud computing platform.

Consistent with disclosed embodiments, the resource usage indication(s) can be obtained by semantic layer 110 or a component thereof (e.g., service constructor 111, or a similar component). In some embodiments, semantic layer 110 may be configured to request the resource usage indication(s). In some embodiments, semantic layer 110 may request the resource usage indication(s) according to instructions. In some embodiments, such instructions can be provided by a user (e.g., by interacting with user system 130 to access semantic layer 110 through a user interface). In some embodiments, user 130 can provide a program, script, or the like, which can include instructions to obtain resource usage indications from the cloud providers corresponding to the cloud platforms specified in the description.

Semantic layer 110 or a component thereof (e.g., service constructor 111, or a similar component) can execute or interpret the instructions to request resource usage indication(s) from cloud providers. In various embodiments, such instructions can be generated by service constructor 111. For example, service constructor 111 can receive a declarative specification specifying performance of the first cloud operation on the first cloud platform. Based on this received specification, service constructor 111 can request the resource usage indication(s) from cloud provider(s). In some embodiments, the request(s) can be implemented as API calls or web services invocations. In some embodiments, response(s) to the requests can be, include, or indicate the first usage indication.

As used herein, a resource usage indication may include an indication of at least one of a storage amount, a compute amount, a number of transactions, a bandwidth, a number of application programming interface calls, or an application or database type associated with a corresponding cloud operation. The resource usage indication may be direct (e.g., indication the amount of resources used) or indirect (e.g., providing a metric, score, value, or the like indicative of the amount of resources used). A storage amount may indicate an expected storage amount, e.g., a memory space expected to be used in performance of the first cloud operation. A compute amount may indicate an expected compute amount, e.g., an expected amount of computing power used for performing the first cloud operation (which can be expressed, for example, as an amount of time running a machine or virtual machine having a certain performance level). A number of transactions may indicate an expected number of transactions, e.g., an expected number of transactions with cloud provider 120 during or as part of performance of the first cloud operation (e.g., transactions with client system 140 or semantic layer 110, or another system). A bandwidth may indicate an expected bandwidth, e.g., a rate of data transfer used in performance of the first cloud operation. The number of application programming interface calls may indicate a reference number of application programming interface calls, e.g., a number of API calls to a corresponding cloud server made in performance of the first cloud operation. The application or database type may indicate an exemplary application program or database used in performance of the first cloud operation. In some embodiments, an indirect resource usage indication may include an expected monetary charge for performing the first cloud operation. In some embodiments, the resource usage indication may depend upon historical data for the first cloud operation (e.g., indications of actual resource usage attributable to past performance of the first cloud operation or a similar cloud operation). In various embodiments, the resource usage indication may include an indication of such actual resource usage. In some embodiments, the resource usage indication may depend upon an indication of current resource usage to perform the first cloud operation.

In some embodiments, the description can specify multiple implementations. The multiple implementations can differ in at least one of cloud operations used or cloud computing platforms used. In such embodiments, obtaining the resource usage indication(s) can include obtaining such indications for each of the multiple implementations. For example, service constructor 111 can obtain the resource usage indication(s) for each cloud computing operation for a first implementation on a first cloud computing platform. Service constructor 111 can also obtain the resource usage indication(s) for each cloud computing operation for a second implementation on a second cloud computing platform. In some embodiments, service constructor 111 may store received resource usage indication(s) in a local or remote storage device, e.g., database in association with corresponding cloud operation(s), implementation(s), semantic layer operation(s), etc.

At step S230, a request that indicates performance of a semantic layer operation may be received from client system 140. Step S230 may be performed by, for example, service master 112, or another component of semantic layer 110. In some embodiments, this request may be received via a user interface provided by semantic layer 110 (e.g., by service master 112 of semantic layer 110). In some embodiments, a graphical user interface provided by service master 112 may display semantic layer operation available for performance by semantic layer 110. A client may interact with client system 140 to select one of the displayed semantic layer operations. In some embodiments, the graphical user interface may display available implementations for a semantic layer operation. For example, in response to selection of a semantic layer operation, the graphical user interface may display multiple implementations of that semantic layer operation. A client may interact with client system 140 to select one of the displayed semantic layer operations.

In some embodiments, the request that indicates performance of the semantic layer operation may further include configuration information. The configuration information may include at least one of security information, performance information, reliability information, or cloud provider information for performing a desired semantic layer operation. The security information may include data storage compatibility information, security software program or version information, or any other security measurement information desired for performing the semantic layer operation. The performance information may include task amount information, operation completion time information, allocated computing power information, allocated network bandwidth information, etc. The reliability information may include operation performance guaranteed rate information, operation execution sustainability information, execution failure-retry number information, etc. The cloud provider information may include cloud provider identification information, locality information, etc. Consistent with disclosed embodiments, the client can impose conditions on the implementation of the semantic layer operation through the provided configuration information.

In some embodiments, request may not include configuration information. Consistent with disclosed embodiments, the configuration information may be received separately from the request from client system 140. In some instances, semantic layer 110 (e.g, service master 112) can be configured to obtain the configuration information through one or more additional request/response exchanges with client system 140. In some embodiments, for example, semantic layer 110 may be configured to provide, in response to receiving the request, at least one configuration option to client system 140. In some embodiments, certain configuration options, or combinations of configuration options, can be associated with certain implementations. For example, a first configuration option may have two values and a second configuration option can have two values, describing four possible combinations. Three of those combinations may be compatible with a first implementation, while the fourth combination may be compatible with a second implementation. By selecting the configuration options, a client can select an implementation of the semantic layer operation.

In some embodiments, semantic layer 110 can store configuration options for each implementation (e.g., in a database accessible to semantic layer 110, or the like). In some embodiments, service constructor 111 may receive configuration options for each implementation when receiving a resource usage indication of the implementation. In some embodiments, semantic layer 110 may parse the configuration options from the received resource usage indication or information received from a cloud provider (e.g., a cloud provider associated with one of local cloud 120a, remote cloud 120b, or remote cloud 120c). In some embodiments, a client can interact with client system 140 to provide, in response to receiving the at least one configuration option from service master 112, at least one selection of the at least one configuration option to service master 112. For example, when multiple configuration options are provided, client system 140 can provide a selection of one or more configuration options (e.g., configuration options satisfying expectations or requirements of the client). Service master 112 may receive the at least one selection of the at least one configuration option from client system 140. In this disclosure, the at least one selection of the at least one configuration option may be referred to as "configuration information" received from client system 140.

At step S240, an estimated resource usage indication may be provided to client system. Step S240 may be performed by semantic layer 110, or a component thereof (e.g., service master 112 or another suitable component). In some embodiments, the estimated resource usage indication may be based on the request received at step S230 and the resource usage indications obtained at step S220. Semantic layer 110 may provide an estimated resource usage indication of the first implementation including the first cloud operation.

In some embodiments, providing the estimated resource usage indication at step S240 may include estimating, based on the request at S230, at least one of a number of times the semantic layer operation will be performed, an amount of data transferred between semantic layer 110 and a cloud computing platform performing the semantic layer operation for performing the semantic layer operation, an amount of data stored or duration of data storage by the cloud computing platform in accordance with the semantic layer operation, or an amount of computation performed by the cloud computing platform in accordance with the semantic layer operation. The estimated resource usage indication may be determined based on the resource usage indication for the corresponding implementation received from cloud provider 120 at step S220 and the request at step S230.

Consistent with disclosed embodiments, when configuration information is received at step S230, service master 112 may provide an estimated resource usage indication of an implementation consistent with this configuration information. When no implementations meet the configuration information, service master 112 may be configured to send a notification that no options are available for the configuration information. In some embodiments, service master 112 may suggest that client system provides different configuration information. In some embodiments, the estimated resource usage indication may further be determined based on the received configuration information.

In some embodiments, client system 140 may not send the configuration information and thus, service master 112 may not receive the configuration at step S230. Instead, service master 112 may be configured to provide configuration information when providing the estimated resource usage indication at S240. The configuration information may be associated with the first implementation associated with the estimated resource usage indication. In some embodiments where multiple estimated resource usages indications corresponding multiple implementations for a semantic layer operation are provided, configuration information associated with each of the multiple implementations may be provided to client system 140.

At step S250, confirmation of the request may be received from client system 140 in response to provision of the estimated resource usage indication. Step S240 may be performed by semantic layer 110, or a component thereof (e.g., service master 112 or another suitable component). Client system 140 may send the confirmation of the request in response to receiving the estimated resource usage indication by step S240. In some embodiments where service master 112 provide multiple estimated resource usage indications associated with multiple implementations at step S240, client system 140 may select one implementation among the multiple implementations. The confirmation of the request may include the selection of one of the multiple implementations. When client system 140 does not intend to proceed with any implementation, client system 140 may provide non-selection information (e.g., by cancelling a dialog box, selecting a "cancel" control, or the like).

At step S260, service master 112 may communicate with cloud provider 120 to perform the semantic layer operation in accordance with the request. Service master 112 may communicate with cloud provider 120 that provides the implementation confirmed by client system 140 at step S250. Service master 112 may instruct the cloud service platform to perform the semantic layer operation according to the confirmed implementation. The implementation of the semantic layer operation can be described by a specification, which can be modified or parameterized by the configuration information (when present). Service master 112 can be configured to interact with the cloud services platform to implement the (optionally modified or parameterized) specification.

As a non-limiting example, a semantic layer operation may include cloud data storage and retrieval. As an initial step, the semantic layer can communicate with the selected cloud computing platform according to the selected implementation to create the necessary resources to store and retrieve data (e.g., creating databases and database servers, creating load balancers to distribute requests to the database servers, etc.). The semantic layer can subsequently receive an original upload request from a client system (e.g., client system 140) to provide data to the selected cloud computing platform. The original upload request can include the data. The semantic layer can be configured to generate an upload request in a suitable format (e.g., by translating the original request and/or the data) and provide the generated upload request to the selected cloud computing platform. The resources hosted by cloud computing platform can then store the data. Semantic layer 110 can also receive original download requests from other systems. Semantic layer 110 can generate suitable download requests based on the original download requests and provide the generated download requests to the selected cloud computing platform. The resources hosted by cloud computing platform can then retrieve the requested data and provide it to semantic layer 110. Semantic layer 110 can then format the retrieved data into a format expected by the requesting system and provide the formatted data to the requesting system. Upon cessation of the cloud data storage and retrieval operation, semantic layer 110 can provide instructions to tear down the resources hosted by the cloud computing system. As would be appreciated by those of skill in the art, the instructions used to provision/teardown the resources, and the formats in which data is provided to/retrieved from the selected cloud computing platform, can depend on the cloud computing platform and the selected implementation. Semantic layer 110 can hide this complexity from the client, enabling them to perform sophisticated cloud computing operations without needing to understand, or even be aware of, these details.

FIG. 3 depicts a flowchart illustrating a second process 300 for providing a cloud computing semantic layer, consistent with embodiments of the present disclosure. In some embodiments, second process 300 can be performed by semantic layer 110 of FIG. 1.

As illustrated in FIG. 3, at step S310, a description of a semantic layer operation may be received. Step S310 may be performed by semantic layer 110 or a component thereof (e.g., service constructor 111 or the like). In some embodiments, semantic layer 110 may receive the description from a user interacting with semantic layer 110 through user system 130. The description may specify performance of the semantic layer operation by semantic layer 110. In some embodiments, the description of the semantic layer operation may include multiple implementations performed on cloud computing platforms (e.g., local cloud 120a, remote cloud 120b, remote cloud 120c, or the like) associated with one or more cloud providers. The cloud computing platforms may provide multiple implementations performed on one or more cloud computing platforms for the corresponding semantic layer operation. For example, local cloud 120a may provide one implementation for the corresponding semantic layer, remote cloud 120b may provide one or more implementations, and remote cloud 120c may not provide any implementations. The multiple implementations may differ in at least one of cloud operations used or cloud computing platforms used.

In some embodiments, second process 300 may further include updating service master 112 to include an entry corresponding to the semantic layer operation. In some embodiments, the entry may indicate the multiple implementations for performing the semantic layer operation. Semantic layer 110 or a component thereof (e.g., service master 112 or the like) can be configured to provide a graphical user interface. Clients can interact with the graphical user interface to indicate performance of the semantic layer operation. In some embodiments, the graphical user interface can display multiple entries corresponding to different semantic layer operations that can be performed using semantic layer 110. In some embodiments, in response to selection of a particular semantic layer operation, the graphical user interface can display multiple entries corresponding to different implementations of that semantic layer operation.

At step S320, a request that indicates performance of a semantic layer operation may be received from client system 140. Semantic layer 110 or a component thereof (e.g., service master 112 or the like) can be configured to receive the request. The request may specify the semantic layer operation that the client interacting with client system 140 desires to be performed by semantic layer 110. In some embodiments, the request can be received through client interactions (e.g., using client system 140, or the like) with the user interface described with regards to step S310. For example, client system 140 may provide the request by indicating selection of an entry corresponding to the semantic layer operation among the displayed entries. In some embodiments, as described herein, client system 140 can provide a specification, script, program, or the like, which can indicate performance of the semantic layer operation.

For example, client system 140 can provide a declarative specification describing an architecture that expressly or implicitly requires performance of the semantic layer operation. As an additional example, client system 140 can provide an imperative script that includes semantic layer operations as function calls.

In some embodiments, the request may specify a schedule for performing the semantic layer operation. In some embodiments, the schedule may include a time information, reiteration period information, a start time information, a completion time information, etc. In some embodiments, semantic layer 110 or a component thereof (e.g., service constructor 111, service manager 12, or the like) can provide the schedule to the cloud providers. The resource usage indications receive from the cloud providers can depend on this schedule information.

At step S330, resource usage indications corresponding to implementation(s) of the selected semantic layer operation can be obtained. As described above, a resource usage indication may include an indication of at least one of a storage amount, a compute amount, a number of transactions, a bandwidth, a number of application programming interface calls, or an application or database type associated with a corresponding cloud operation. The resource usage indication may be direct (e.g., indication the amount of resources used) or indirect (e.g., providing a metric, score, value, or the like indicative of the amount of resources used).

Semantic layer 110 or a component thereof (e.g., service constructor 111, service manager 12, or the like) can be configured to obtain the resource usage indications. As described herein, different implementation of the semantic layer operation can correspond to different cloud computing platforms, or differing assortments of cloud computing operations on the same cloud computing platform. Accordingly, semantic layer 110 can be configured to obtain the resource usage indications from cloud computing providers associated with these cloud computing platforms. As described herein, in some embodiments, semantic layer 110 can obtain the resource usage indications using API calls to or web services interfaces exposed by the cloud computing platforms.

At step S340, a first implementation among the multiple implementations may be selected based on the received first resource usage indications. Step S340 may be performed by semantic layer 110 or a component thereof (e.g., service constructor 111, service manager 12, or the like). The selection may be performed in response to the request received at step S320. In some embodiments, the selected first implementation may be performed using a cloud computing platform (e.g., one of local cloud 120a, remote cloud 120b, remote cloud 120c, or the like). In some embodiments, semantic layer 110 may select the first implementation from a certain cloud provider as a default for a certain semantic layer operation. For example, the entity associated with semantic layer 110 can have an agreement with the cloud provider associated with a particular cloud computing platform to implement certain semantic layer operations using that platform. In some instances, the client may have the opportunity to select implementations on other cloud computing platform, while in other instances that opportunity may not be presented.

In some embodiments, selecting the first implementation at step S340 may include estimating, based on the request at S320, at least one of a number of time the semantic layer operation will be performed, an amount of data transferred between semantic layer 110 and a cloud computing platform performing the semantic layer operation for performing the semantic layer operation, an amount of data stored or duration of data storage by the cloud computing platform in accordance with the semantic layer operation, or an amount of computation performed by the cloud computing platform in accordance with the semantic layer operation. The estimated resource usage indications for performing the requested semantic layer operation by the multiple implementations may be determined based on the first resource usage indication(s) for the corresponding implementations received from the cloud computing providers at step S330 and the request at step S340. In some embodiments, the first implementation may be selected based on the estimated resource usage indications corresponding to the multiple implementations.

At step S350, semantic layer 110 or a component thereof (e.g., service master 112, or another suitable component) may communicate with the selected cloud computing platform to perform the semantic layer operation in accordance with the request at step S320 and the selected implementation. As described herein, semantic layer 110 may communicate with the cloud computing platform that provides the selected implementation. Service master 112 can provide data and instructions to configure the cloud computing platform to provide the selected first implementation. Accordingly, semantic layer 110 can perform the semantic layer operation according to the selected implementation using cloud computing operations performed by the cloud computing platform.

At step S360, while the semantic layer operation continues to run, semantic layer 110 or a component thereof can determine whether to recheck the resource usage indications. In various embodiments, the resource usage indication check may be performed repeatedly, periodically, according to a schedule, or in response to an event. In various embodiments, such an event could include receipt (e.g., from client system 140, or another system) of a request to check resource usage indications, or receipt (e.g., from a cloud services provider) of an actual resource usage indication or change in a projected resource usage indication for the semantic layer operation (or a cloud computing operation specified by the semantic layer operation). For example, semantic layer 110 may receive a direct or indirect indication that the amount of compute, storage, bandwidth, API calls, or the like used by the semantic layer operation greatly exceeds the original estimated resource usage indication.

Consistent with disclosed embodiments, when semantic layer 110 determines not to recheck the resource usage indication (the "Y" branch of S360), the semantic layer may then return to step S350 and continue performing the semantic layer operation according to the currently selected implementation.

Consistent with disclosed embodiments, when semantic layer 110 determines to recheck the resource usage indication (the "Y" branch of S360), the semantic layer may then return to step S330 and repeat the process of obtaining resource usage indications (e.g., in step S330), selecting an implementation (which may or may not be the same as the current implementation), and communicating with a cloud provider (which may or may not be the cloud provider of the cloud service platform currently implementing the semantic layer operation) to perform the operation using the selected implementation.

Upon return to step S330, second resource usage indications corresponding to cloud operations may be received. In some embodiments, the second resource usage indications may correspond to the first resource usage indications but may have changes from the first resource usage indications.

In some embodiments, the second resource usage indications may reflect updates, changes, etc. from the first resource usage indications. The updates, changes, etc. may have occurred since the time the first resource usage indications were constructed. In some embodiments, the second resource usage indications may reflect current resource usage indications at the time the second resource usage indications are constructed. In some embodiments, service constructor 111 may be configured to request corresponding cloud provider 120 to send the second resource usage indications corresponding to the cloud operations. In some embodiments, the second resource usage indications may be received in response to the request.

At step S340 in the second round, a second implementation among the multiple implementations may be selected based on the received first resource usage indications in a first round and the second resource usage indications. In some embodiments, second process 300 may further include comparing the first resource usage indications and the second resource usage indications before selecting the second implementation. In some embodiments, the second implementation selected in the second round may be same as or different from the first implementation selected in the first round. The second implementation selected in the second round may be a different implementation performed using the same cloud computing platform associated with the cloud provider that provides the first implementation selected in the first round. The second implementation selected in the second round may be an implementation performed using a cloud computing platform associated a cloud provider different from the cloud provider that provides the first implementation selected in the first round. In some embodiments, selecting the second implementation may be based on comparison between first estimated resource usage indications based on the first resource usage indications and second estimated resource usage indication based on the second resource usage indications.

At step S350 in the second round, semantic layer 110 or a component thereof (e.g., service master 112, or another suitable component) may communicate with cloud provider 120 to transfer performance of the semantic layer operation in accordance with the selection at step S340 in the second round. Semantic layer 110 may communicate with the cloud computing platform (e.g., remote cloud 120b) that provides the implementation selected in the first round to transfer performance of the semantic layer operation or with another cloud computing platform (e.g., remote cloud 120c) that provides the second implementation selected in the second round to continue performance of the semantic layer operation. Accordingly, the second cloud computing platform (e.g., remote cloud 120c) could perform the remainder of the semantic layer operation in response to the communication. When the original implementation selection is maintained at step S350, semantic layer 110 may communicate with the cloud computing platform (e.g., remote cloud 120b) to keep performing the semantic layer operation. In some embodiments, such as when data is stored on the first cloud computing platform, the semantic layer can be configured to route transactions with client system 140 to the appropriate cloud platform. For example, when data for a first data range is stored on the first cloud computing platform (e.g., remote cloud 120b) and data for a second data range is stored on the second cloud computing platform (e.g., remote cloud 120c), semantic layer 110 can serve as a federation layer, enabling queries to retrieve data from the appropriate cloud computing platform. Semantic layer 110 can also perform any data processing necessary to combine data or intermediate results obtained from the two different cloud computing platforms.

In some embodiments, second process 300 may further include providing an indication of the comparison and the selection at step S350 to client system 140. The comparison may be comparison between the first resource usage indications and the second resource usage indications. The selection may be the selection of the second implementation that is different from the first implementation selected in the first round. Second process 300 may further include receiving, in response to the provided indication, a request to transfer performance of the semantic layer operation to the second implementation. A client can determine whether to transfer performance of the semantic layer operation to the second implementation based on the provided indication. In response to the request by client system 140, semantic layer 110 or a component thereof (e.g., service master 112, or another suitable component) may communicate with a cloud computing platform to transfer performance of the semantic layer operation. In some embodiments, when client system 140 does not provide a request to transfer performance of the semantic layer operation, the performance may not be transferred. While described herein as a manual process, in which client determined whether the transfer the service, transference of performance of the semantic layer operation can also be performed automatically. For example, sematic layer 110 can automatically communicate with the first and second cloud platforms to transfer the service, based on predetermined criteria or criteria specified by a user or client, or the like. As an additional example, client system 140 can automatically provide instructions to semantic layer 110 to transfer the service, based on predetermined criteria or criteria specified by the client, or the like.

When the operation has been completed, second process 300 can terminate as shown in FIG. 3. When the operation has not been completed, steps S330 to S360 may be repeated as illustrated with respect to the second round.

Figures 4A, 4B:
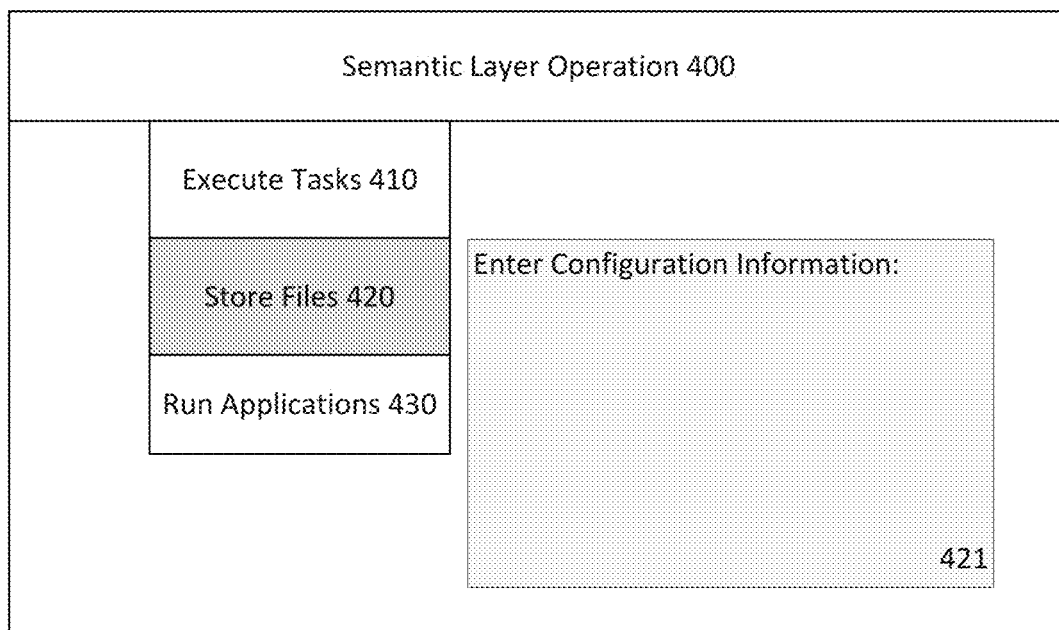
FIG. 4A depicts a schematic diagram illustrating an example of a user interface, consistent with the embodiments of the present disclosure.
FIG. 4B depicts an exemplary script including a call to a semantic layer operation, consistent with the embodiments of the present disclosure.

FIG. 4A depicts a schematic diagram illustrating an example of a user interface, consistent with the embodiments of the present disclosure. FIG. 4A illustrates an example user interface suitable for selecting a semantic layer operation and for providing configuration information. As depicted in FIG. 4A, the user interface provided by semantic layer 110 may display semantic layer options as a menu of semantic layer operation 400. FIG. 4A illustrates, as an example, three semantic layer operation options, e.g., execute tasks 410, store files 420, and run applications 430. An option, store files 420 is selected and the selection may be indicated on the display (e.g., shaded in FIG. 4A). Once the selection is made, the interface may display a configuration window 421 that enables a client to interact with client system 140 to enter configuration information. By entering configuration information, the client can provide configuration information to semantic layer 110.

FIG. 4B depicts an exemplary script including a call to a semantic layer operation, consistent with the embodiments of the present disclosure. The script defines a function "build_folder" that includes a call to a semantic layer operation, the method "filestore.build_folder( )." When invoked, executed, or interpreted, the script of FIG. 4B can cause semantic layer 110 to perform the method to create a folder on a cloud computing platform. The method takes the name of the folder to create and returns a list of folders. In some embodiments, a client can interact with client system 140 to provide the script depicted in FIG. 4B to semantic layer 110 through a user interface provided by semantic layer 110. It would be appreciated that FIG. 4B illustrates the method "filestore.build_folder( )" as a non-limiting example of a semantic layer operation and that the present disclosure may be applied to any semantic layer operations.

FIG. 4C illustrates an example of an implementation of the semantic layer operation "filestore.build_folder( )". Consistent with disclosed embodiments, a user can interact with semantic layer 110 using user system 130 to create this implementation. In some embodiments, the user can directly provide a script specifying the implementation (e.g., the user can provide the script depicted in FIG. 4C). In various embodiments, the script can be generated through interactions between the user and semantic layer 110. Consistent with disclosed embodiments, the script of FIG. 4C can cause the sematic layer to implement the semantic layer operation "filestore.build_folder( )" in FIG. 4B on a cloud computing platform. In this non-limiting example, the implementation can be specific to the AMAZON WEB SERVICES (AWS) cloud platform and can create an S3 bucket on AWS. As described herein, in some embodiments semantic layer 110 can implement the semantic layer operation "filestore.build_folder( )" using the implementation depicted in FIG. 4C. Semantic layer 110 can select this implementation based on received resource usage indications corresponding to cloud operations involved in this implementation (e.g., the "s3.create_bucket" cloud operation; resource usage indications, such as indirect resource usage indications, associated with storing data in the created bucket; or the like) According to the script depicted in FIG. 4C, an S3 bucket with a specified name (e.g., the name provided in the call of the semantic layer operation in FIG. 4B) can be created. In some embodiments, a globally unique name on AWS S3 may be specified for a bucket. When a region in AWS S3 is specified, a bucket can be created in the specified region. The script further illustrates error handling (e.g., providing an error when the bucket could not be created or the specified region does not match the current session region). In some embodiments, errors thrown by the implementation can be caught and handled by the semantic layer without notifying the user. In other embodiments, the user may be notified of such errors. While FIG. 4C illustrate a script to build S3 bucket on AWS S3, it will be appreciated that embodiments of the present disclosure are not limited to such and semantic layer 110 may be configured to build a similar functionality in other cloud platforms such as GOOGLE CLOUD, MICROSOFT AZURE, etc.

Figure 5:
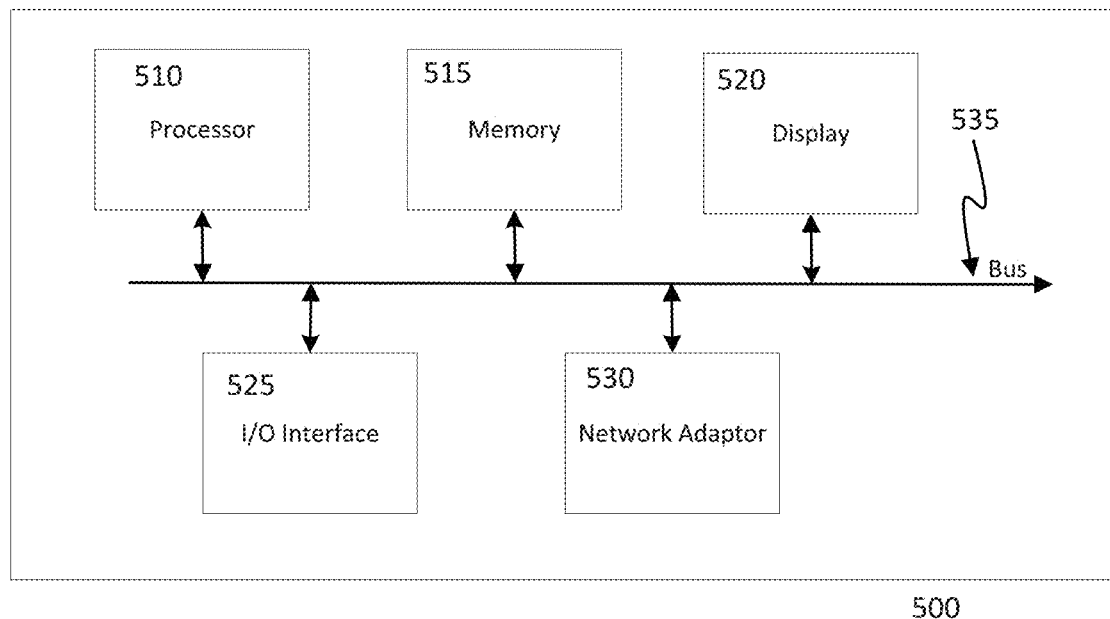
FIG. 5 depicts a computing system suitable for implementing a semantic layer, consistent with embodiments of the present disclosure.

FIG. 5 depicts a computing system 500 suitable for implementing a semantic layer, consistent with embodiments of the present disclosure. Computing system 500 may be a standalone server, or may be a part of a subsystem, which may be part of a larger system. At least some components of computing system 500 may be distributed, and thus are remotely located and communicate over a network. Computing system 500 may include any computer, such as a desktop computer, a laptop computer, a tablet, or the like, configured to perform processes (e.g., first process 200 of FIG. 2, second process 300 of FIG. 3, etc.) of semantic layer 110. As depicted in FIG. 5, computing system 500 may have a processor 510, a memory 515, a display 520, an input/output (I/O) interface 525, and a network adaptor 530.

Processor 510 may include or one or more known processing devices such as, for example, a microprocessor. In some embodiments, processor 510 may include any type of single or multi-core processor, mobile device microcontroller, central processing unit, etc. In operation, processor 510 may execute computer instructions (program code) and may perform functions in accordance with techniques described herein. Computer instructions may include routines, programs, objects, components, data structures, procedures, modules, and functions, which may perform particular processes described herein. In some embodiments, such instructions may be stored in memory 515, in processor 510, or elsewhere. Consistent with the disclosed embodiments, processor 510 may include service constructor 111 or service master 112 shown in FIG. 1. In some embodiments, service constructor 111 and service master 112 may be organized or arranged separately from each other. In some embodiments, service constructor 111 and service master 112 may be combined into one module serving the functions of both elements.

Memory 515 may include one or more storage devices configured to store instructions used by processor 510 to perform functions related to disclosed embodiments. For example, memory 515 may be configured with one or more software instructions associated with programs and/or data.

Memory 515 may include a single program that performs the functions of semantic layer 110, or multiple programs. Additionally, processor 510 may execute one or more programs located remotely from processor 510. Memory 515 may also store data that may reflect any type of information in any format that semantic layer 110 may use to perform operations consistent with disclosed embodiments. Memory 515 may be a volatile or non-volatile (e.g., ROM, RAM, PROM, EPROM, EEPROM, flash memory, etc.), magnetic, semiconductor, tape, optical, removable, non-removable, or other type of storage device or tangible (i.e., non-transitory) computer-readable medium.

Display 520 may be configured to display a user interface through which user 130 or client system 140 interact with semantic layer 110. Display 520 may be any type of display, e.g., a cathode-ray tube display, a liquid crystal display, or a light-emitting diode display for displaying a content. In some embodiments, display 520 may be configured to display a user interface through which user 130 may construct, mange, or administer one or more semantic layer operations. Display 520 may further be configured to display a user interface through which client system 140 may perform semantic layer operation performance related actions.

I/O interface 525 may be one or more devices configured to allow data to be received and/or transmitted by computing system 500. I/O interface 525 may include one or more customer I/O devices and/or components, such as those associated with a keyboard, mouse, touchscreen, display, etc. I/O interface 525 may also include one or more digital and/or analog communication devices that allow computing system 500 to communicate with other machines and devices, such as other components of environment 100. I/O interface 525 may also include interface hardware configured to receive input information and/or display or otherwise provide output information. For example, I/O interface 525 may include a monitor configured to display a user interface.

Network adaptor 530 may connect computing system 500 to one or more computer networks. This network can be or include a wide area network (e.g., the internet), a local network, a mobile communications network, or the like. The network can be implemented using wired, wireless, cellular, or other communication technologies. The disclosed embodiments are not limited to any particular type of network or network implementation. Computing system 500 may receive data and instructions over the network using network adaptor 530 and may transmit data and instructions over the network using network adaptor 530. In some embodiments, network adaptor 530 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

Bus 535 can be a communication device that transfers data between components inside computing system 500, such as an internal bus (e.g., a CPU-memory bus), an external bus (e.g., a universal serial bus port, a peripheral component interconnect express port), or the like.

The disclosed embodiments are not limited to implementation using a single computing system. For example, semantic layer 110 including multiple computing systems similar to computing system 500 (e.g., a cluster, or a cloud computing platform) can be configured to interoperate to perform the disclosed processes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. Furthermore, non-transitory computer-readable media can contain instructions, that when executed by one or more processor, cause a computing system (e.g., a cloud computing platform, computing cluster, or the like) to implement the disclosed systems and methods. In addition, while certain components have been described as being coupled to one another, such components may be integrated with one another or distributed in any suitable fashion.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for providing cloud computing semantic layer operation, comprising:
    at least one processor; and
    at least one non-transitory computer-readable medium containing instructions that, when executed by the at least one processor, cause the system to perform operations comprising:
        receiving, from a client interacting with a semantic layer, a request that indicates performance of a semantic layer operation, wherein the semantic layer is configured to interact with cloud computing platforms that are associated with cloud providers;
        selecting, in response to the request, a first one of multiple implementations of the semantic layer operation based on the request and first resource usage indications corresponding to cloud operations corresponding to the multiple implementations, the first one of the multiple implementations using a first one of the cloud computing platforms, wherein the first resource usage indications comprise direct or indirect indications of at least one of a storage amount, a compute amount, a number of transactions, a bandwidth, a number of application programming interface calls, an application type, or a database type associated with each of the cloud operations; and
        communicating with a first one of the cloud providers to perform the semantic layer operation in accordance with the request and using the selected first one of the multiple implementations.

2. The system of claim 1, wherein:
    the operations further comprise:
        receiving, from the cloud providers, second resource usage indications corresponding to the cloud operations;
        comparing the first resource usage indications and the second resource usage indications;
        selecting, based on the comparison, a second one of the multiple implementations, the second one of the multiple implementations using a second one of the cloud computing platforms; and
        communicating with at least one of the first one of the cloud computing platforms or the second one of the cloud computing platforms, to transfer performance of the semantic layer operation to the selected second one of the multiple implementations.

3. The system of claim 2, wherein:
    the operations further comprise:
        providing an indication of the comparison and the selection of the second one of the multiple implementations to the client; and
        receiving, in response to the provided indication, a request to transfer performance of the semantic layer operation to the selected second one of the multiple implementations; and
        the performance of the semantic layer operation is transferred in response to the received request to transfer the performance of the semantic layer operation.

4. The system of claim 1, wherein:
    selecting, in response to the request, the first one of the multiple implementations comprises estimating, based on the request, at least one of:
        a number of times the semantic layer operation will be performed;
        an amount of data transferred between the semantic layer and each of the cloud computing platforms by performance of the semantic layer operation;
        an amount of data stored or duration of data storage by each of the cloud computing platforms in accordance with the semantic layer operation; or
        an amount of computation performed by each of the cloud computing platforms in accordance with the semantic layer operation.

5. The system of claim 1, wherein:
    the first resource usage indications comprise historical or current resource usage indications.

6. The system of claim 1, wherein:
    the operations further comprise:
        requesting the first resource usage indications based on and in response to the request.

7. The system of claim 1, wherein:
    the operations further comprise:
        updating a services master to include an entry corresponding to the semantic layer operation, the entry indicating the multiple implementations and the corresponding first resource usage indications; and
        displaying entries in the services master to the client, the displayed entries including the entry corresponding to the semantic layer operation; and
    the client interacts with the displayed entries to provide the request.

8. The system of claim 1, wherein:
    the request specifies the semantic layer operation and a schedule for performing the semantic layer operation.

9. A method for providing cloud computing semantic layer operation, comprising:
    receiving, by a computing system from a client interacting with a semantic layer, a request that indicates performance of a semantic layer operation, wherein the semantic layer is configured to interact with cloud computing platforms that are associated with cloud providers;
    selecting, by the computing system in response to the request, a first one of multiple implementations of the semantic layer operation based on the request and first resource usage indications corresponding to cloud operations corresponding to the multiple implementations, the first one of the multiple implementations using a first one of the cloud computing platforms, wherein the first resource usage indications comprise direct or indirect indications of at least one of a storage amount, a compute amount, a number of transactions, a bandwidth, a number of application programming interface calls, an application type, or a database type associated with each of the cloud operations; and
    communicating, by the computing system, with a first one of the cloud providers to perform the semantic layer operation in accordance with the request and using the selected first one of the multiple implementations.

10. The method of claim 9, further comprising:
receiving, by the computing system from the cloud providers, second resource usage indications corresponding to the cloud operations;
comparing, by the computing system, the first resource usage indications and the second resource usage indications;
selecting, by the computing system, based on the comparison, a second one of the multiple implementations, the second one of the multiple implementations using a second one of the cloud computing platforms; and
communicating, by the computing system, with at least one of the first one of the cloud computing platforms or the second one of the cloud computing platforms, to transfer performance of the semantic layer operation to the selected second one of the multiple implementations.

11. The method of claim 10, further comprising:
providing, by the computing system, an indication of the comparison and the selection of the second one of the multiple implementations to the client; and
receiving, by the computing system in response to the provided indication, a request to transfer performance of the semantic layer operation to the selected second one of the multiple implementations; and
the performance of the semantic layer operation is transferred in response to the received request to transfer the performance of the semantic layer operation.

12. The method of claim 9, wherein:
selecting, in response to the request, the first one of the multiple implementations comprises estimating, based on the request, at least one of:
  a number of times the semantic layer operation will be performed;
  an amount of data transferred between the semantic layer and each of the cloud computing platforms by performance of the semantic layer operation;
  an amount of data stored or duration of data storage by each of the cloud computing platforms in accordance with the semantic layer operation; or
  an amount of computation performed by each of the cloud computing platforms in accordance with the semantic layer operation.

13. The method of claim 9, wherein:
the first resource usage indications comprise historical or current resource usage indications.

14. The method of claim 9, further comprising:
requesting, by the computing system, the first resource usage indications based on and in response to the request.

15. The method of claim 9, further comprising:
updating, by the computing system, a services master to include an entry corresponding to the semantic layer operation, the entry indicating the multiple implementations and the corresponding first resource usage indications; and
displaying, by the computing system, entries in the services master to the client, the displayed entries including the entry corresponding to the semantic layer operation; and
the client interacts with the displayed entries to provide the request.

16. The method of claim 9, wherein:
the request specifies the semantic layer operation and a schedule for performing the semantic layer operation.

17. A non-transitory computer readable medium containing instructions that, when executed by at least one processor of a system, cause the system to perform operations comprising:
receiving, from a client interacting with a semantic layer, a request that indicates performance of a semantic layer operation, wherein the semantic layer is configured to interact with cloud computing platforms that are associated with cloud providers;
selecting, in response to the request, a first one of multiple implementations of the semantic layer operation based on the request and first resource usage indications corresponding to cloud operations corresponding to the multiple implementations, the first one of the multiple implementations using a first one of the cloud computing platforms, wherein the first resource usage indications comprise direct or indirect indications of at least one of a storage amount, a compute amount, a number of transactions, a bandwidth, a number of application programming interface calls, an application type, or a database type associated with each of the cloud operations; and
communicating with a first one of the cloud providers to perform the semantic layer operation in accordance with the request and using the selected first one of the multiple implementations.

18. The computer readable medium of claim 17, wherein:
the operations further comprise:
  receiving, from the cloud providers, second resource usage indications corresponding to the cloud operations;
  comparing the first resource usage indications and the second resource usage indications; and
  selecting, based on the comparison, a second one of the multiple implementations, the second one of the multiple implementations using a second one of the cloud computing platforms; and
  communicating with at least one of the first one of the cloud computing platforms or the second one of the cloud computing platforms, to transfer performance of the semantic layer operation to the selected second one of the multiple implementations.

19. The computer readable medium of claim 18, wherein:
the operations further comprise:
  providing an indication of the comparison and the selection of the second one of the multiple implementations to the client; and
  receiving, in response to the provided indication, a request to transfer performance of the semantic layer operation to the selected second one of the multiple implementations; and
the performance of the semantic layer operation is transferred in response to the received request to transfer the performance of the semantic layer operation.

20. The computer readable medium of claim 17, wherein:
selecting, in response to the request, the first one of the multiple implementations comprises estimating, based on the request, at least one of:
  a number of times the semantic layer operation will be performed;
  an amount of data transferred between the semantic layer and each of the cloud computing platforms by performance of the semantic layer operation;
  an amount of data stored or duration of data storage by each of the cloud computing platforms in accordance with the semantic layer operation; or an amount of computation performed by each of the cloud computing platforms in accordance with the semantic layer operation.

\* \* \* \* \*